US008219905B2

(12) United States Patent
Akrout et al.

(10) Patent No.: US 8,219,905 B2
(45) Date of Patent: Jul. 10, 2012

(54) AUTOMATICALLY DETECTING KEYBOARD LAYOUT IN ORDER TO IMPROVE THE QUALITY OF SPELLING SUGGESTIONS

(75) Inventors: Amine Akrout, Dublin (IE); Hisham El-Shishiny, Giza (EG); Pavel Volkov, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 898 days.

(21) Appl. No.: 12/272,316

(22) Filed: Nov. 17, 2008

(65) Prior Publication Data

US 2010/0125725 A1 May 20, 2010

(51) Int. Cl.
*G06F 17/00* (2006.01)
(52) U.S. Cl. .................................................. 715/257
(58) Field of Classification Search .................. 715/259, 715/257; 713/100
See application file for complete search history.

(56) References Cited

U.S. PATENT DOCUMENTS

| 6,047,300 | A | * | 4/2000 | Walfish et al. | ................. 715/257 |
| 2006/0224586 | A1 | * | 10/2006 | Pickover et al. | .................. 707/6 |
| 2006/0274051 | A1 | | 12/2006 | Longe et al. | |
| 2007/0016682 | A1 | * | 1/2007 | Hodgson | ........................ 709/228 |

OTHER PUBLICATIONS

Input Language of Terminal Server Client Does Not Match That of Terminal Server Session, Article ID322042, Last Review Oct. 30, 2006, Microsoft Support, Revision 3.3, pp. 2-4.*
Huang et al.,"Large Scale Experiments on Correction of Confused Words", IEEE 2001, pp. 77-82.
Kane et al., "Automatically Correcting Typing Errors for People with Motor Impairments", The Information School, University of Washington, Seattle, WA 98195, USA, Date: Oct. 2007.

* cited by examiner

*Primary Examiner* — Adam M Queler
*Assistant Examiner* — Howard Cortes
(74) *Attorney, Agent, or Firm* — Convergent Law Group LLP

(57) ABSTRACT

A method, system and computer program product for keyboard layout detection resulting in improving the quality of the spelling suggestions, and in another aspect, recognizing a keyboard mapping mismatch between a computer and a given remote user based on a defined finite dictionary. There is no extra Application Programming Interfaces (API) required to pass information between the text editor and a spellchecking engine in order to perform keyboard layout detection.

22 Claims, 5 Drawing Sheets

AUTOMATICALLY DETECTING KEYBOARD LAYOUT IN ORDER TO IMPROVE THE QUALITY OF SPELLING SUGGESTIONS

BACKGROUND OF THE INVENTION

1. Field of the Invention

This invention generally relates to the field of computer systems and spell-checking accessories and features for associated keyboards, and more specifically to a system and method for improving the quality of spelling suggestions by automatically detecting a keyboard layout and, for recognizing a keyboard mapping mismatch between a computer and a given remote user device based on a defined finite dictionary.

2. Background Art

One of the most important sources of keyboard mistyping is keyboard key proximity errors. Spellcheckers after detecting typographic mistakes, provide a number of suggestions to help the user correcting them. For keyboard proximity errors, which are the most common typing errors, suggested corrections depend on the keyboard layout. There are different computer keyboard layouts with the same character set available. For instance, standard "QWERTY" keyboard can be used for most Latin languages while national variants like French-specific layout are also available. Another example is English Dvorak keyboard layout that can be used instead of "QWERTY".

The information related to keyboard layout is essential for spellcheckers to provide the users with the right spelling suggestions. For example, the user may type the word "alao" instead of "also". Since "alao" is detected as a misspelled word, the spellchecker engine will assume that the user might have wanted to type the "s" key rather than the "a" since "a" and "s" keys are close to each other on the keyboard, and will suggest "also" as a correction. The following table illustrates possible key typing mistakes due to proximity for two different keyboard layout:

TABLE 1

| Mistyped Key | English Keyboard QWERTY possible correct keys | French Keyboard AZERTY possible correct keys |
|---|---|---|
| a | q | z |
|   | w | q |
|   | s |   |
|   | z |   |

Most correction systems of typing mistakes use the English keyboard layout as default, which means that other likely suggestions are ignored, or irrelevant corrections are suggested if a different layout is used. At the same time it is not possible for applications to detect the layout information from the operating system as some operating systems do not provide that information at all. In case a spellchecker engine needs to know the keyboard layout information, it has to support extended Application Programming Interfaces (hereafter API) to request and obtain relevant information about the layout of the keyboard being used, which adds an extra complexity to the integration of text editing applications and linguistic engines. Existing text editing applications do not request actual keyboard layout information from the user, and therefore are unable to benefit from knowing the actual layout to improve the quality of their spelling suggestions. Furthermore, there are no known solutions to us for the automatic detection of keyboard layout. Therefore, there is a need for an automatic solution to be integrated with text editors, which automatically detects the layout of the keyboard and use this information to improve the quality of the spelling suggestions, with no need to integrate user interface or additional APIs.

Strings of alphabet or numeric characters entered using a specific keyboard layout will look different if they are assumed to be entered from another keyboard layout. As an illustration, the following table summarizes the differences between letters when entered from a French Keyboard when assumed to be entered from an English Keyboard.

TABLE 2

| English Keyboard | French keyboard |
|---|---|
| q | A |
| w | Z |
| a | Q |
| z | W |
| m | ; |

Therefore, a user typing some text, e.g. the Linux command 'who', when entered from the French Keyboard, will be 'zho' when assumed to be entered from an English Keyboard.

In case a remote user connecting to a server, using Virtual Network Computing (VNC) or Secure Shell (SSH), and the remote machine (or server) is running a specific platform (Linux, Windows operating systems . . . ) and is configured for a certain keyboard layout, if the remote user is using a different keyboard layout, a keyboard mismatch will occur. Thus, there exists a problem of how to dynamically detect the user keyboard layout to avoid this mismatch.

There are no known solutions to us for the automatic detection of keyboard layout, and current operating systems do not provide this information. Therefore, there is a need for an automatic solution that dynamically detects the layout of the keyboard when a remote user is connecting to a server, e.g., using VNC or other connection, and the server is configured for a certain keyboard layout that is different from the keyboard layout used by the remote user.

Basically Spellchecker engines accept and handle spelling requests from text editing applications. There are two types of requests available in most spell checking engines namely spell verification and spell aid. Spell verification requests contain input text words and spell checker replies whether or not the text words are misspelled. Spell aid request contains a misspelled word for which the spellchecker obtains and returns a number of spelling suggestions.

There are two main sources of spelling errors that most of spellcheckers are handling namely keyboard mistypings and phonetic errors. Keyboard mistypings are generally due to either keyboard proximity of keys or physical similarity of characters. Spellcheckers usually have spelling correction rules related to the above mentioned spelling errors in order to generate spelling suggestions. Correction rules present a model of possible errors people or text recognition software can make within a certain language. Keyboard proximity correction rules depends on the layout of the keyboard used. Subsets of correction rules for different keyboard layouts are used.

SUMMARY OF THE INVENTION

The present invention is directed to a system, method and computer program product for automatically detecting which subset of keyboard proximity correction rules should be used or ranked higher as a result of a spelling error caused by a mismatched keyboard. This is accomplished by learning which spelling suggestions are picked up by the user, automatically reinstate the possible keyboard layout and finally re-rank keyboard proximity correction rules.

Keyboard layout detection according to the invention, is an advantage as it results in improving the quality of the spelling suggestions. An additional advantage of the system and method of the invention is that there is no extra API required to pass information between the text editor and the spellchecking engine in order to perform layout detection. Thus, the proposed method can be easily integrated into existing text processing software.

When a remote user connects to a server, using VNC or SSH, with the server running a specific platform (Linux, Windows...) and is configured for a certain keyboard layout, if the remote user is using a different keyboard layout, a keyboard mismatch will occur. The system and method of the present invention dynamically detects the user keyboard layout to avoid this mismatch.

Since a user, after logging-in remotely to a server running a specific platform (Linux, Windows...), will generally start by typing some operating system commands, then if there is a keyboard mismatch resulting from the user using certain keyboard layout different than the one configured or programmed to recognize at the server side, the received string at the server side will be treated as an unknown operating system command. In this invention, the operating system commands are defined as a finite dictionary. The received unknown string can be used to detect the correct remote user keyboard layout by looking for the specific keyboard layout mismatch that caused this error in the command. Suppose, for example, that a remote VNC user using a French keyboard is connected to a server running Linux and configured for an English keyboard. When the remote user types the Linux command "date" it will be seen at the server as "dqte" which is considered an unknown string or an error. By looking for which keyboard layout mismatch can transform "dqte" to a correct entry in the defined finite dictionary, it can be detected that a French keyboard layout can cause the "date" Linux command to be the unknown string "dqte". Therefore, it can be deduced that the remote user is using a French keyboard and the server can be reconfigured for this user for a French keyboard layout.

Keyboard layout detection is obviously an advantage specially that it is done dynamically without the user intervention.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
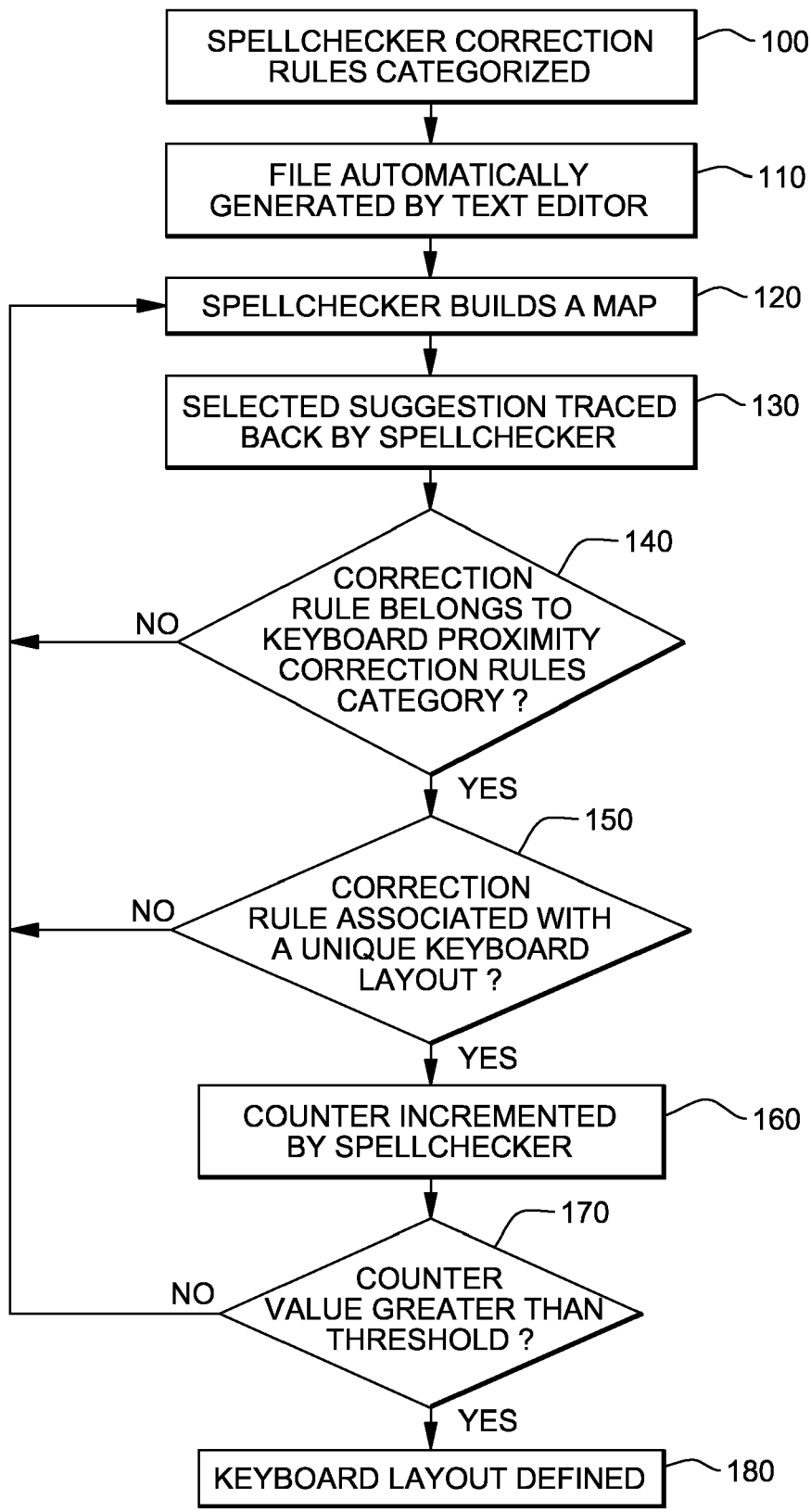
FIG. 1 illustrates a flowchart for improving the quality of spelling suggestions according to one aspect of the invention.

FIG. 1 illustrates a flowchart for improving the quality of spelling suggestions according to one aspect of the invention. In step 100 of FIG. 1, Spellchecker correction rules are first categorized according to the source of spelling errors. An example correction rule comprises "p=o", which means: replace the letter "p" by the letter "o" which is in the proximity of letter "p" on the keyboard. Therefore, the string "errpr" can be corrected by replacing the letter "p" by the letter "o" and the unknown string "errpr" becomes "error". Correction rules associated with keyboard proximity of keys are further labelled (categorized) as either associated with standard keyboard layout or a specific national keyboard layout.

When a user starts a text editor for the first time, a file (hereafter called Keyboard file) is automatically generated, in step 110, for the user by the text editor and stored on disk. This file contains a binary variable that is used as a switch and integer variables that are used as counters related to keyboard layouts. All variables are initialized to zero values.

In step 120, during spell aid requests, the spellchecker builds a map that can be used to track spelling suggestions back to corresponding spelling correction rules. That is, as the spell-checker returns to the user a list of spelling suggestions for the misspelled word, it tracks (maps) the correction rule that generated each spelling suggestion. In the example above, the suggested word "error" is mapped (tracked) to the correction rule "p=o" which suggested "error" for "errpr" by replacing the letter "p" by the letter "o".

In step 130, as long as the switch has a zero value, the selected suggestion by the user is traced back by the spellchecker to the originating correction rule using the map from step 120. That is, when the spell-checker detects an unknown string, it returns to the end-user a list of suggested words and the end-user has to select only one word from the list of suggested words generated by the spell-checker.

In step 140, a determination is made as to whether the originated correction rule in step 130 belongs to the keyboard proximity correction rules' category. If the originated correction rule in step 130 belongs to the keyboard proximity correction rules' category, then the process proceeds to step 150. Otherwise, the process returns to step 120. It is understood that upon return to step 120, the built map is not changed. That is, returning to step 120 signifies that the current unknown string could not be used to detect the keyboard layout and the process proceeds to the next unknown string detected in the text and the process repeated.

In step 150, as the correction rule belongs to the keyboard proximity correction rules' category, a determination is made as to whether the correction rule is associated with a unique keyboard layout within the keyboard proximity correction rules' category. If the correction rule is associated with a unique keyboard layout, then a counter related to this specific keyboard layout is incremented by the spellchecker, in step 160, and the process proceeds to step 170. Otherwise, the process returns to step 120 without incrementing the counter.

At step 170, it is determined whether the counter for that specific keyboard layout has reached or surpassed a given threshold. If the counter for a specific keyboard layout has not reached or surpassed a given threshold, the process returns to step 120. Only when the counter of a specific keyboard layout reaches an arbitrary number (agreed upon for the system), the spellchecker instantiates the relevant keyboard layout being used at step 180. Consequently, the relevant keyboard proximity error correction rules are ranked on top for future spell aid requests. That is, the list of suggested words for the misspelled word is ranked. If the probable correct word is highly ranked, then the user will find it and select it quickly. The suggested words are ranked on the list of suggested words according to the rank of the correction rules that generated them. The counter's main functionality is to decrease the probability of having a wrong selection of keyboard layout if the user makes typographic mistakes using keys not in the immediate proximity of the appropriate key, which may be traced to the wrong correction rule and hence, incorrect keyboard layout.

It should be understood that upon return to step 120, e.g., from step 160, 170, whatever map that has been built is not changed. That is, returning to step 120 signifies that the current unknown string could not be used to detect the keyboard layout and the process proceeds to the next unknown string detected in the text and the process is repeated.

Once a keyboard layout has been automatically detected based on the above, the spellchecker sets the value of the switch to one (in case the user changes his keyboard layout in the future, that user may delete the keyboard file and a new file will be created by the text editor the next time the text editor is invoked).

The following example illustrates how the invention works in the case of a French keyboard layout being used.

One of few differences in French layout is the proximity of keys 'p' and 'm' unlike on standard Latin QWERTY keyboard. Corresponding correction rule would require the substitution of the letter 'p' to 'm' and vice versa.

In a further example, assume that the spellchecker receives the misspelled word "aipe" in step 120 above and the following suggestion set is generated:

aise
aime←selected by the user as the mistyping was due to the proximity of the key 'p' to 'm' on the French keyboard layout
aie
aine
aise The above list is presented to the user by the text editor, and the user should pick up one suggestion ("aime" in this case) which is then traced back by the spellchecker to the originated correction rule, as described in step 130. Since the correction rule is associated with the French national keyboard, then the spellchecker must increment the counter related to the French national keyboard as in step 150. Only when this counter reaches the arbitrary number as described in step 160, the French national keyboard is instantiated and correction rules are re-ranked and the switch value is set to one. This method allows for an automatic detection of the keyboard layout which results in improving the quality of the spelling suggestions. An additional advantage of using the method described above is that there is no extra APIs required to pass information between the text editor and the spell checking engine in order to detect keyboard layouts.

Existing text editors may adopt this method based on keyboard layout detection without rework on integration or the need for user interface.

It is possible to implement and integrate this keyboard layout detection technique, and hence improve the spelling suggestions, into Lotus Notes client version 6.5, 7.02 and 8, for example, and like editing programs. To enable keyboard detection in these versions of Lotus Notes one would need to replace a dictionary file (e.g. canadien.dic) and also replace speller module library (dlt.jar); otherwise, no additional code change for Lotus Notes is required.

Figure 2:
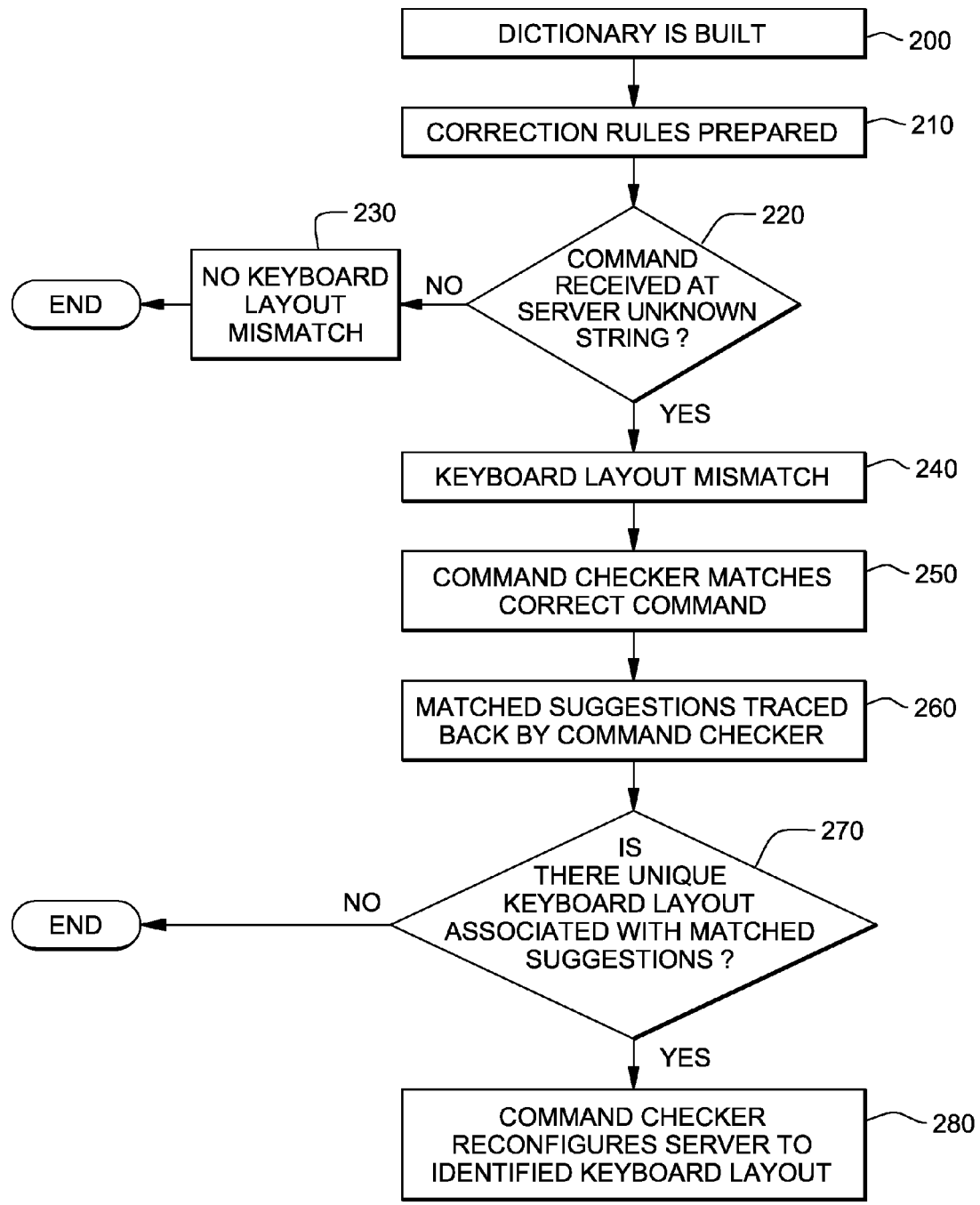
FIG. 2 illustrates a flowchart for recognizing a keyboard mapping mismatch between a computer and a given remote user based on a defined finite dictionary according to one aspect of the invention.
Figure 5:
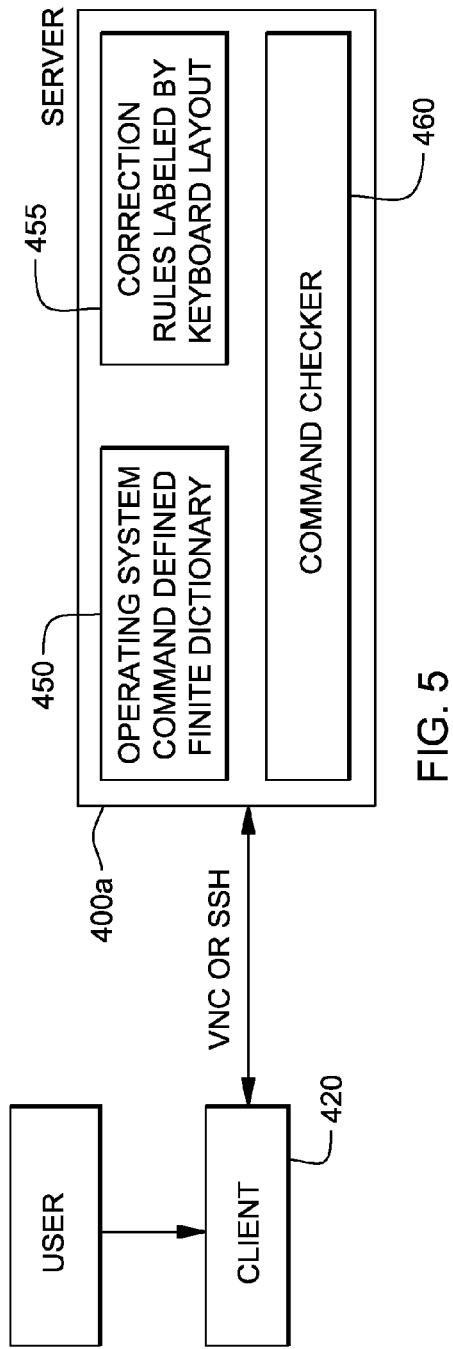
FIG. 5 is a system block diagram of a first embodiment of the current invention comprising a client and a server environment.

FIG. 2 illustrates a flowchart for recognizing a keyboard mapping mismatch between a computer and a given remote user based on a defined finite dictionary according to one aspect of the invention. A detailed description of a system employing the methodology described in FIG. 2, that is embodied as programmed computer code and executable within a client/server embodiment is depicted in FIG. 5.

In step 200 of FIG. 2, a defined finite dictionary for the operating system commands (Linux, Windows . . . ) is built which comprises, for example, a list of all the operating system commands listed alphabetically.

In step 210, Correction rules similar to typographic correction rules are prepared based on keyboard layout mismatches and the correction rules are labelled, i.e., categorized with their originating keyboard layouts.

When the remote user connects to the server, using VNC or SSH, he or she will generally start by typing some operating system commands. In step 220, a determination is made as to whether the command received at the server side is a string unknown to the operating system. If the command received is not an unknown string, then there is no keyboard layout mismatch at step 230. If the command received is an unknown string, then there is a keyboard layout mismatch, at step 240, resulting from the user using a keyboard layout different than the one configured at the server and, an spelling aid request for the mismatched command is generated by calling a program (herein after called the 'Command Checker") running on the server (in the form of a shell for the case of Linux for example, which is able to execute the operating system commands).

In step 250, the Command Checker makes an attempt to match correct command in the finite dictionary built in step 200 applying correction rules prepared at step 210.

In step 260, the matched suggestions are traced back by the Command Checker to the originating correction rule (or rules) and accordingly to the corresponding keyboard layouts.

In step 270, a determination is made as to whether there is a unique keyboard layout associated with the matched suggestions. If there is a unique keyboard layout associated with the matched suggestions, then the Command Checker reconfigures the server to the identified keyboard layout, in step 280; otherwise, the process terminates. In case the unknown string to the Operating System could be attributed to more than one keyboard layout, then the Command Checker selects any one from them at random and the command is executed. The Command Checker temporarily stores all the ambiguous keyboard layouts for this specific user. The next unknown Operating System command that is typed by this same remote user will be matched by the Command Checker against only the temporarily stored ambiguous keyboard layouts for this particular user. This will progressively resolve the ambiguity among the stored keyboard layouts for this user. Once a unique keyboard layout is identified, then the temporarily stored keyboard layouts for this user will be erased.)

Figure 3:
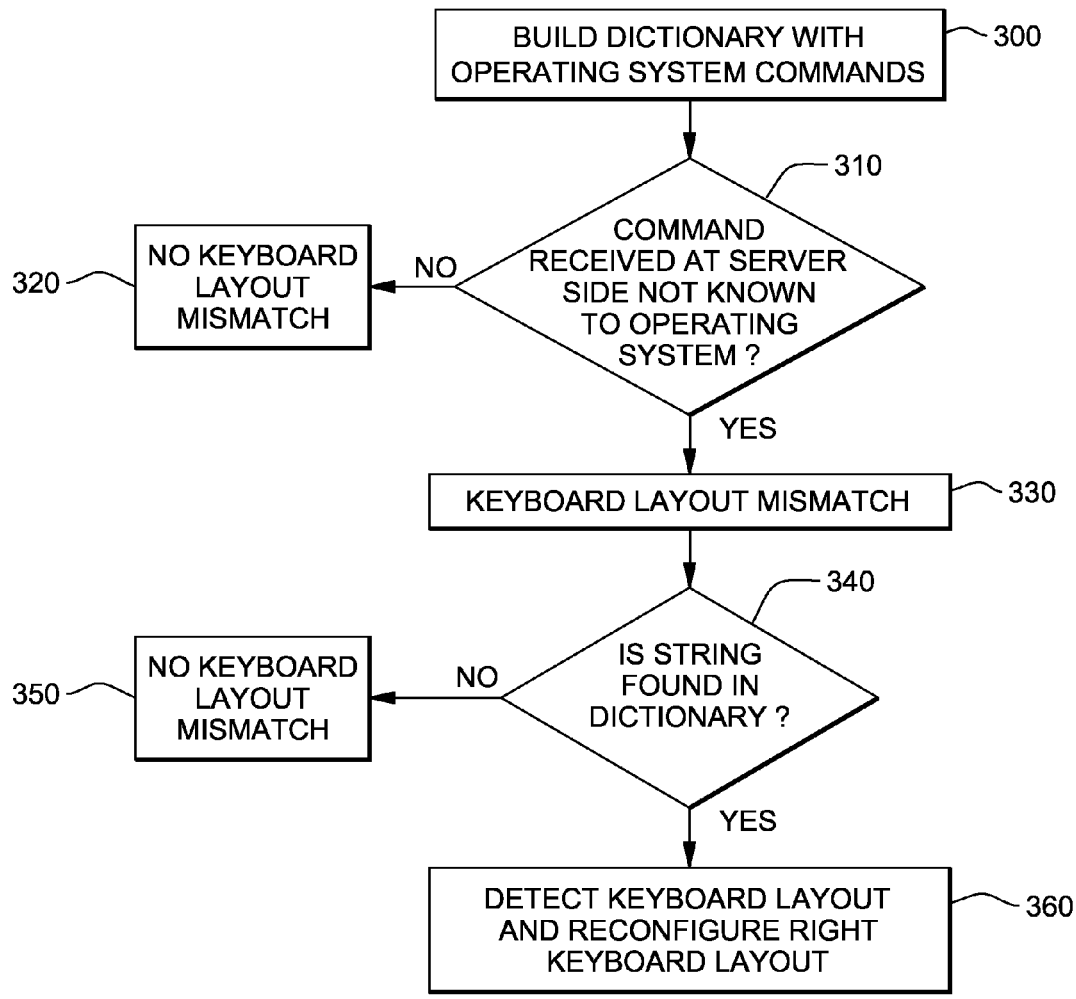
FIG. 3 illustrates a flowchart of an alternative embodiment for recognizing a keyboard mapping mismatch between a computer and a given remote user based on a defined finite dictionary according to one aspect of the invention.
Figure 6:
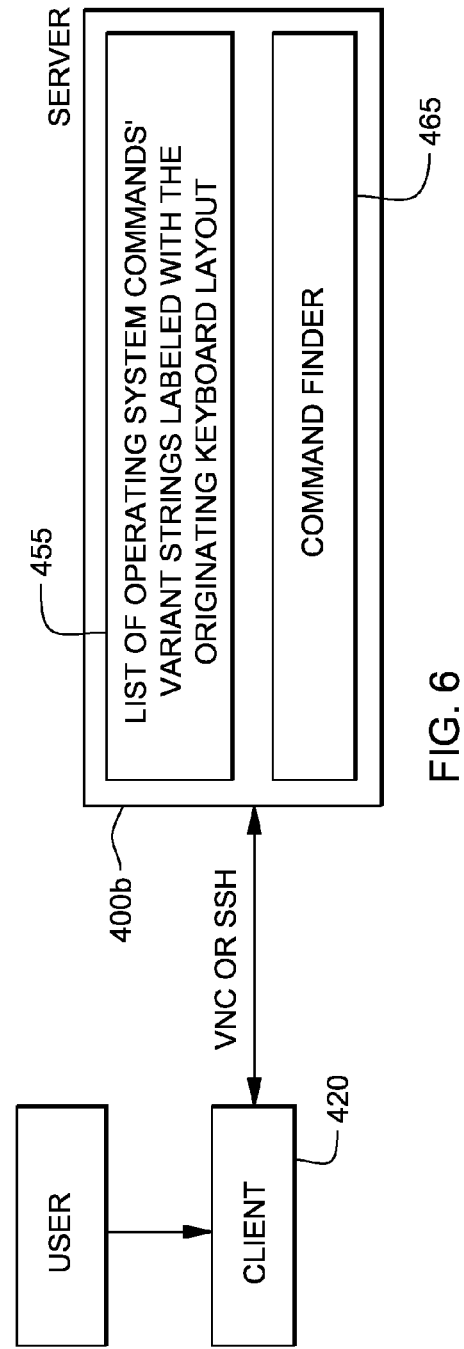
FIG. 6 is a system block diagram of a second embodiment of the current invention comprising a client and a server environment.

FIG. 3 illustrates a flowchart of an alternative embodiment for recognizing a keyboard mapping mismatch between a computer and a given remote user based on a defined finite dictionary according to one aspect of the invention. A detailed description of a system employing the methodology described in FIG. 3, that is embodied as programmed computer code and executable within a client/server embodiment is depicted in FIG. 6.

In step 300 of FIG. 3, a defined finite dictionary is built with operating system commands. For each string representing a command, the equivalent strings are generated as if generated from other keyboard layouts. A list of all the commands' variant strings each categorized with the originating keyboard layout is obtained.

In step 310, a determination is made as to whether the command received at the server side is known to the operating system. If it is determined that the command received at the server side is known to the operating system, then there is no keyboard layout mismatch and the process terminates. If it is determined that the command received at the server side is not known to the operating system, then there is a keyboard layout mismatch in step 330 and the process proceeds to step 340.

In step 340, a determination is made as to whether the string found is in the built dictionary having Operating System commands. That is, the program looks in the built dictionary for the unknown string in the commands' variant strings list labeled with the originating keyboard layout as generated in step 300 above (e.g., using binary search). If the string is not found in the list, no keyboard layout mismatch is found, step 350. If the string is found in the list, the process proceeds to step 360. As it will be possible to detect the remote user keyboard layout, the server reconfigures the right keyboard layout at step 360. In case the unknown string to the Operating System could be attributed to more than one keyboard layout, then the program selects any one from them at random and the command is executed. The program temporarily stores all the ambiguous keyboard layouts for this specific user. The next unknown Operating System command that is typed by this same remote user will be matched by the program against only the temporarily stored ambiguous keyboard layouts for this particular user. This will progressively resolve the ambiguity among the stored keyboard layouts for this user. Once a unique keyboard layout is identified, then the temporarily stored keyboard layouts for this user will be removed.

Step 310 and 330 above may be implemented in a different way. For example the program may check if the command is on the list generated in step 300 even before it tries to execute it.

Figure 4:
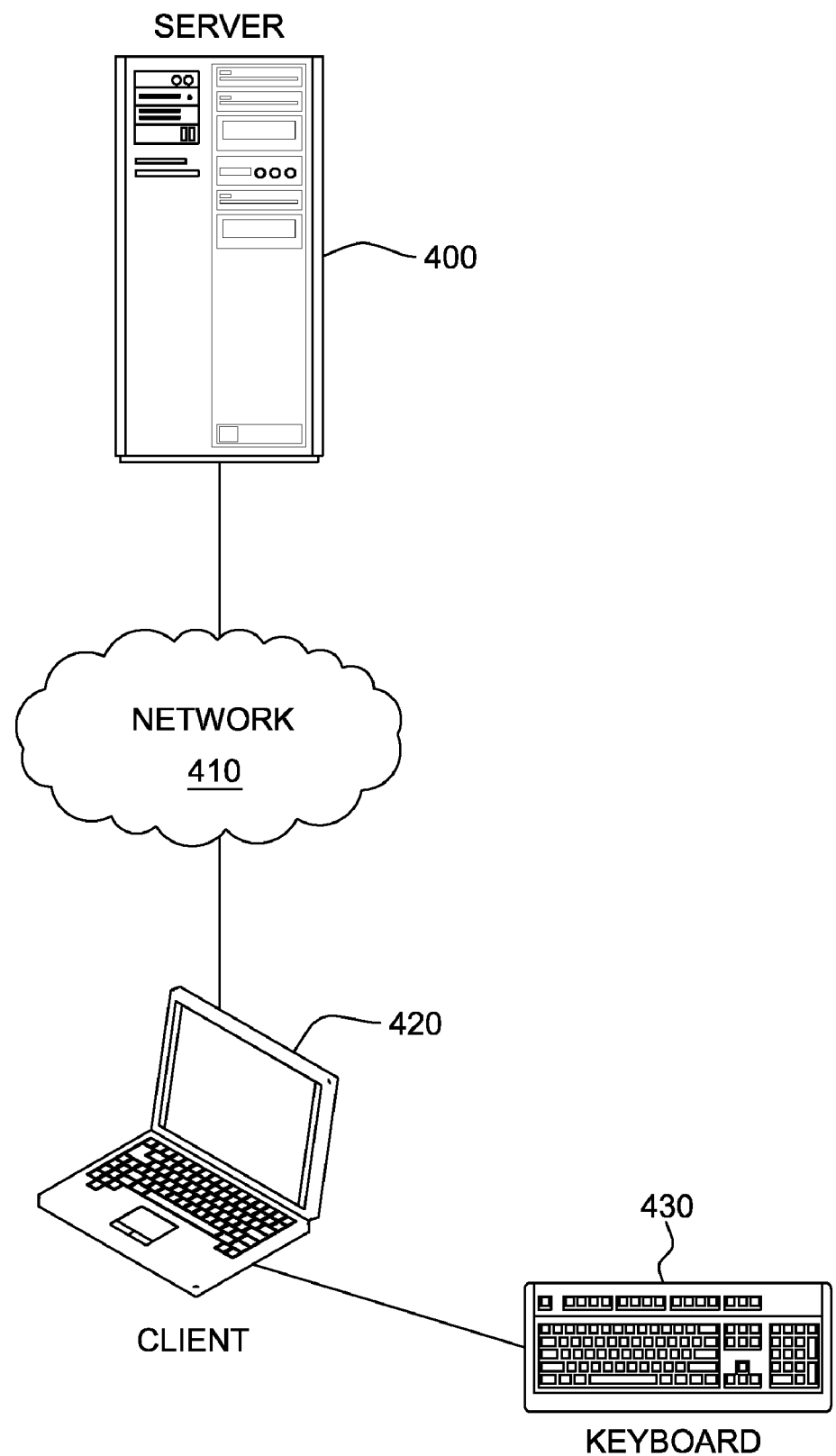
FIG. 4 depicts a system diagram where one embodiment of the present invention is employed.

FIG. 4 depicts a system diagram where one embodiment of the present invention is employed. A server device 400 is connected to a network 410 such as Internet via a communication link (e.g., a wireless link or a wired link). The server device 400 is a personal computer, a laptop, a workstation, etc. The network 410 is the Internet, an intranet, a wireless network, ATM network, wired network, etc. A client device 420 is connected to the network 410 via a communication link. The client device 420 is a personal computer, a laptop, a workstation, etc. The client device 420 comprises a display device and an input/output device (e.g., a keyboard 430, a mouse (not shown)).

FIG. 5 is a system block diagram of a first embodiment of the current invention comprising a client and a server environment, wherein a server 400a executes program code for performing the methodology as described with respect to FIG. 2. A remote user connects through the client device to the server 400a (e.g., a remote machine) via VNC or SSH. The server has the following three components: 1) a 'Defined Finite Dictionary' component that includes the commands of a certain operating system (Linux, Windows . . . ), which is built by the designer of the system; 2) a set of 'Correction Rules' (similar to typographic correction rules), which are prepared by the designer of the system based on keyboard layout mismatches. The correction rules are labeled with their originating keyboard layouts; and, 3) 'Command Checker', which is a programmed code written by the designer of the system and is running on the server (in the form of a shell for the case of Linux for example). This code is able to execute the operating system commands.

FIG. 6 is a system block diagram of a second embodiment of the current invention comprising a client and a server environment. A remote user connects through the client device to a server 400b (e.g., a remote machine) via VNC or SSH. The server has the following two components: 1) a list 455 of operating system commands' variant strings labeled with the originating keyboard layout. For each string representing a command, equivalent strings are generated as if generated from other keyboard layouts; and, 2) a 'Command Finder' code 465, which is code written by the designer of the system, and is capable of doing a binary search to lookup for a string in the list of operating system commands' variant strings.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) executed by a processor (e.g., Intel® Core™ 2, IBM® PowerPC®) for causing a computer to perform method steps of this invention. The present invention may include a method of deploying a computer program product including a program of instructions in a computer readable medium for one or more functions of this invention, wherein, when the program of instructions is executed by a processor, the compute program product performs the one or more of functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for improving the quality of spelling suggestions by automatically detecting keyboard layout, said method comprising the steps of:
   a) categorizing spellchecker correction rules according to a source of spelling errors, one category comprising a keyboard proximity rules category;
   b) automatically generating a file when a user starts a text editor for the first time, wherein said automatically generated file includes one or more integer variables that are used as counters related to corresponding keyboard layouts;
   c) building a map that can be used to track spelling suggestions for an misspelled word in user-generated text back to corresponding spelling correction rules, said spelling suggestions generated as a list of suggested words for the misspelled word by a spell-checker device when identifying a current unknown string in the text;
   d) selecting, by the end-user, a suggested word from the list of suggested words provided by a spell-checker for the misspelled word, and tracing a selected suggested word back by said spellchecker to an originating correction rule;
   e) determining whether said originating correction rule belongs to keyboard proximity correction rules' category;
   f) if said originating correction rule belongs to keyboard proximity correction rules' category, further determining whether said originating correction rules are associated with a corresponding keyboard layout; and
   g) if said originating correction rules are associated with a corresponding keyboard layout, incrementing a respective said integer variable counter associated with that corresponding keyboard layout,
   comparing an integer variable counter value with a predetermined threshold associated with that corresponding keyboard layout, and
   when it is determined that said integer variable counter value is greater than said predetermined threshold, instantiating the corresponding keyboard layout for improving the quality of the spelling suggestions.

2. The method according to claim 1, wherein if said originating correction rule is determined not to belong to keyboard proximity correction rules' category, or, if said originating correction rules are not associated with a corresponding keyboard layout, then, returning to step c), said method including proceeding to a next unknown string detected in the text and repeating steps c)-f) until said originating correction rule is determined to belong to keyboard proximity correction rules' category.

3. The method according to claim 1, wherein categorizing spellchecker correction rules further comprises associating correction rules with keyboard proximity of keys further labeled as either associated with standard keyboard layout or a specific national keyboard layout.

4. The method according to claim 1, wherein said automatically generated file further comprises a binary variable that is used as a switch, said spellchecker setting a switch value when a keyboard layout has been automatically detected.

5. The method according to claim 1, further comprising: providing a dictionary for mapping user-entered text to an operating system command;
   recognizing a keyboard mapping mismatch between a computer and a remote user based on said dictionary;
   preparing correction rules based on keyboard layout mismatches;
   determining presence of a keyboard layout mismatch when a user-entered command is an unknown string;
   attempting, by a command checker device, to match a correct command in the dictionary by applying said correction rules against said user entered text;
   tracing back any matched suggestions by said command checker device to an originating correction rule; and,
   determining whether there is a unique keyboard layout associated with matched suggestions; and
   upon determining an associated unique keyboard layout, reconfiguring a server to operate in accordance with said keyboard layout.

6. The method according to claim 5, wherein said correction rules are prepared based on said keyboard layout mismatches, said correction rules being associated with their originating keyboard layouts.

7. The method according to claim 5, wherein if said unknown string is attributed to more than one keyboard layout then said Command Checker device selects any one from them at random and said command is executed.

8. The method according to claim 1, further comprising:
   providing a dictionary comprising computer executable commands, said dictionary including a list of equivalent strings for said executable commands, said equivalent strings including all commands' variant strings, each commands' variant string labeled with an originating keyboard layout;
   recognizing a keyboard mapping mismatch between a computer and a remote user when a command received at the server side is not known to the operating system; and,
   searching, in said commands' variant string list, for an unknown string entered by a user; and, responsive to determining an associated unique keyboard layout based on said searching, reconfiguring a server to operate in accordance with said keyboard layout.

9. The method according to claim 8, wherein if said unknown string is attributed to more than one keyboard layout then a program selects any one from them at random and the command is executed.

10. A computer for improving the quality of spelling suggestions by automatically detecting keyboard layout comprising:
a processing device executing program code configured to:
categorize spellchecker correction rules according to a source of spelling errors, one category comprising a keyboard proximity rules category;
automatically generate a file when a user starts a text editor for the first time, wherein said automatically generated file includes one or more integer variables that are used as counters related to corresponding keyboard layouts;
build a map that can be used to track said spelling suggestions for a misspelled word in user-generated text back to corresponding spelling correction rules, said spelling suggestions generated as a list of suggested words for the misspelled word by a spell-checker device when identifying a current unknown string in the text;
a spell-checker executed by said processor that enables the user to select a suggested word from the list of suggested words for the misspelled word;
said processing program code further configured to:
trace a selected suggested word back by said spellchecker to an originating correction rule; and, for determining whether said originating correction rule belongs to keyboard proximity correction rules' category;
determine in response to a determination that said originating correction rules belong to keyboard proximity correction rules' category, whether said originating correction rules are associated with a corresponding keyboard layout, wherein said determination that said originating correction rules are associated with a corresponding keyboard layout further comprises:
said program code incrementing a respective said integer variable counter associated with that corresponding keyboard layout in response to determining that said originating correction rule is associated with a corresponding keyboard layout, and
said program code comparing an integer variable counter value with a predetermined threshold associated with that corresponding keyboard layout; and
said program code instantiating the specific keyboard layout for improving the quality of the spelling suggestions when it is determined that said originating correction rules are associated with a corresponding keyboard layout, and that said integer variable counter value is greater than said predetermined threshold.

11. The system according to claim 10, wherein, upon a determination that said current unknown string could not be used to detect the keyboard layout, said processing device proceeds to a next unknown string detected in the text and traces a selected suggested word and determines whether said originating correction rules are associated with a specific keyboard layout, and iterates processing until determining said originating correction rule belongs to keyboard proximity correction rules' category.

12. The system according to claim 10, wherein said processing device further associates correction rules with keyboard proximity of keys further labeled as either associated with standard keyboard layout or a specific national keyboard layout.

13. The system according to claim 10, wherein said keyboard file comprises a binary variable that is used as a switch, said spellchecker setting a switch value when a keyboard layout has been automatically detected.

14. The system for according to claim 10, further comprising at least one processor unit configured for:
providing a dictionary for mapping user-entered text to an operating system command;
recognizing a keyboard mapping mismatch between a computer and a remote user based on said dictionary;
preparing correction rules based on keyboard layout mismatches;
determining presence of a keyboard layout mismatch when a user-entered command is an unknown string;
attempting, by a command checker device, to match a correct command in the dictionary by applying said correction rules against said user entered text;
tracing back any matched suggestions by said command checker device to an originating correction rule; and,
determining whether there is a unique keyboard layout associated with matched suggestions; and
upon determining an associated unique keyboard layout, reconfiguring a server to operate in accordance with said keyboard layout.

15. The system according to claim 14, wherein said correction rules are prepared based on said keyboard layout mismatches and said correction rules are labeled with their originating keyboard layouts.

16. The system according to claim 14, wherein if said unknown string is attributed to more than one keyboard layout then said Command Checker device selects any one from them at random and said command is executed.

17. The system according to claim 10, further comprising at least one processor unit configured for:
providing a dictionary comprising computer executable commands, said dictionary including a list of equivalent strings for said executable commands, said equivalent strings including all commands' variant strings, each commands' variant string labeled with an originating keyboard layout;
recognizing a keyboard mapping mismatch between a computer and a remote user when a command received at the server side is not known to the operating system; and,
searching, in said commands' variant string list, for an unknown string entered by a user; and,
responsive to determining an associated unique keyboard layout based on said searching, reconfiguring a server to operate in accordance with said keyboard layout.

18. A computer program product for improving the quality of spelling suggestions by automatically detecting keyboard layout, the computer program product comprising a non-transitory computer usable medium having computer usable program code embodied therewith, the computer usable program code comprising:
computer usable program code configured to a): categorize spellchecker correction rules according to a source of spelling errors, one category comprising a keyboard proximity rules category;
computer usable program code configured to b): automatically generate a file when a user starts a text editor for the first time wherein said automatically generated file includes one or more integer variables that are used as counters related to corresponding keyboard layouts;
computer usable program code configured to c): build a map that can be used to track said spelling suggestions for a misspelled word in user-generated text back to corresponding spelling correction rules, said spelling suggestions generated as a list of suggested words for the misspelled word by a spell-checker device when identifying an unknown string in the text;

computer usable program code configured to d): select, by the end-user, a suggested word from the list of suggested words for the misspelled word and trace a selected suggested word back by said spellchecker to an originating correction rule;

computer usable program code configured to e): determine whether said originating correction rule belongs to keyboard proximity correction rules' category; computer usable program code configured to f): determine, in response to a determination that said originating correction rule belongs to keyboard proximity correction rules' category, whether said originating correction rules are associated with a specific keyboard layout; and computer usable program code configured to g): instantiate the corresponding keyboard layout for improving the quality of the spelling suggestions upon determining that said originating correction rules are associated with that corresponding keyboard layout, incrementing a respective said integer variable counter associated with that corresponding keyboard layout, for comparing an integer variable counter value with a predetermined threshold associated with that corresponding keyboard layout, and when it is determined that said integer variable counter value is greater than said predetermined threshold.

19. The computer program product according to claim 18, wherein if said originating correction rule is determined not to belong to keyboard proximity correction rules' category, or, if said originating correction rules are not associated with a corresponding keyboard layout, then, returning to configured code c), said configured code c) proceeding to a next unknown string detected in the text and repeating implementing configured code c)-configured code f) until said originating correction rule is determined to belong to keyboard proximity correction rules' category.

20. The computer program product according to claim 19, wherein said computer usable program code configured to categorize further comprises computer usable program code configured to associate correction rules with keyboard proximity of keys further labeled as either associated with standard keyboard layout or a specific national keyboard layout.

21. The computer program product according to claim 19, wherein said keyboard file further comprises a binary variable that is used as a switch, said spellchecker setting a switch value when a keyboard layout has been automatically detected.

22. The computer program product according to claim 19, further comprising:

computer usable program code configured for:

providing a dictionary for mapping user-entered text to an operating system command;

recognizing a keyboard mapping mismatch between a computer and a remote user based on said dictionary;

preparing correction rules based on keyboard layout mismatches;

determining presence of a keyboard layout mismatch when a user-entered command is an unknown string;

attempting, by a command checker device, to match a correct command in the dictionary by applying said correction rules against said user entered text;

tracing back any matched suggestions by said command checker device to an originating correction rule; and, determining whether there is a unique keyboard layout associated with matched suggestions; and upon determining an associated unique keyboard layout, reconfiguring a server to operate in accordance with said keyboard layout.

* * * * *